United States Patent
Ostebee et al.

(10) Patent No.: US 9,422,867 B2
(45) Date of Patent: Aug. 23, 2016

(54) VARIABLE VOLUME COMBUSTOR WITH CENTER HUB FUEL STAGING

(71) Applicant: General Electric Company, Schenectady, NY (US)

(72) Inventors: Heath Michael Ostebee, Piedmont, SC (US); Johnie Franklin McConnaughhay, Greenville, SC (US); Jason Thurman Stewart, Greer, SC (US); Christopher Paul Keener, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 747 days.

(21) Appl. No.: 13/760,099

(22) Filed: Feb. 6, 2013

(65) Prior Publication Data

US 2014/0216041 A1    Aug. 7, 2014

(51) Int. Cl.
*F02C 7/22* (2006.01)
*F23R 3/10* (2006.01)
*F23C 5/06* (2006.01)
*F23R 3/28* (2006.01)

(52) U.S. Cl.
CPC ... *F02C 7/22* (2013.01); *F23C 5/06* (2013.01); *F23R 3/10* (2013.01); *F23R 3/283* (2013.01); *F23R 3/286* (2013.01)

(58) Field of Classification Search
CPC .............. F23R 3/04; F23R 3/045; F23R 3/10; F23R 3/22; F23R 3/283; F23R 3/286; F23C 5/06; F16J 15/02; F16J 15/022; F16J 15/025; F02C 7/22

See application file for complete search history.

(56) References Cited

U.S. PATENT DOCUMENTS

| | | |
|---|---|---|
| 3,738,106 A | 6/1973 | Stein et al. |
| 3,742,703 A | 7/1973 | Melconian |
| 3,745,766 A | 7/1973 | Melconian |
| 4,044,553 A | 8/1977 | Vaught |
| 4,365,910 A | 12/1982 | Ford |
| 4,417,846 A | 11/1983 | Elliston |
| 4,497,170 A | 2/1985 | Elliott et al. |
| 4,532,762 A | 8/1985 | Mongia et al. |
| 4,545,196 A | 10/1985 | Mongia et al. |
| 4,567,724 A | 2/1986 | Mongia et al. |
| 4,844,649 A | 7/1989 | Vandenboom |
| 5,195,853 A | 3/1993 | Dooley |
| 5,319,923 A * | 6/1994 | Leonard ............... F23C 7/06 60/39.23 |
| 5,343,697 A | 9/1994 | Johnson et al. |
| 5,404,633 A | 4/1995 | Givler |
| 5,450,725 A * | 9/1995 | Takahara ............... F23R 3/34 60/737 |

(Continued)

OTHER PUBLICATIONS

U.S. Appl. No. 13/471,488, filed May 15, 2012, Keener, et al.

(Continued)

*Primary Examiner* — Devon Kramer
*Assistant Examiner* — Kenneth J Hansen
(74) *Attorney, Agent, or Firm* — Sutherland Asbill & Brennan LLP (57) ABSTRACT

The present application and the resultant patent provide a combustor for use with a gas turbine engine. The combustor may include a number of micro-mixer fuel nozzles and a fuel injection system for providing a flow of fuel to the micro-mixer fuel nozzles. The fuel injection system may include a center hub for providing the flow of fuel therethrough. The center hub may include a first supply circuit for a first micro-mixer fuel nozzle and a second supply circuit for a second micro-mixer fuel nozzle.

18 Claims, 6 Drawing Sheets

(56) References Cited

U.S. PATENT DOCUMENTS

| | | |
|---|---|---|
| 5,540,056 A | 7/1996 | Heberling et al. |
| 5,551,228 A | 9/1996 | Mick et al. |
| 5,664,412 A | 9/1997 | Overton |
| 5,794,449 A * | 8/1998 | Razdan ............... F23D 14/02 60/732 |
| 5,895,211 A | 4/1999 | McMillan |
| 6,425,240 B1 | 7/2002 | Park |
| 6,438,959 B1 | 8/2002 | Dean et al. |
| 7,093,445 B2 | 8/2006 | Corr, II et al. |
| 7,500,347 B2 | 3/2009 | Sanders et al. |
| 7,661,267 B2 | 2/2010 | Pollarolo |
| 2009/0016810 A1 | 1/2009 | Geiger et al. |
| 2010/0175380 A1 | 7/2010 | Davis, Jr. et al. |
| 2010/0186413 A1 * | 7/2010 | Lacy ..................... F23R 3/10 60/740 |
| 2011/0252805 A1 | 10/2011 | Berry et al. |
| 2012/0085100 A1 | 4/2012 | Hughes et al. |
| 2012/0198851 A1 | 8/2012 | Davis, Jr. et al. |
| 2012/0198856 A1 | 8/2012 | Uhm et al. |

OTHER PUBLICATIONS

U.S. Appl. No. 13/669,479, filed Nov. 6, 2012, Chen, et al.

\* cited by examiner

VARIABLE VOLUME COMBUSTOR WITH CENTER HUB FUEL STAGING

STATEMENT REGARDING FEDERALLY SPONSORED RESEARCH OR DEVELOPMENT

This invention was made with government support under Contract No. DE-FC26-05NT42643 awarded by the U.S. Department of Energy. The Government has certain rights in this invention.

TECHNICAL FIELD

The present application and the resultant patent relate generally to gas turbine engines and more particularly relate to a variable volume combustor with a center fuel hub for distributing fuel to a number of fuel nozzles.

BACKGROUND OF THE INVENTION

Operational efficiency and the overall output of a gas turbine engine generally increases as the temperature of the hot combustion gas stream increases. High combustion gas stream temperatures, however, may produce higher levels of nitrogen oxides and other types of regulated emissions. A balancing act thus exists between the benefits of operating the gas turbine engine in an efficient high temperature range while also ensuring that the output of nitrogen oxides and other types of regulated emissions remain below mandated levels. Moreover, varying load levels, varying ambient conditions, and many other types of operational parameters also may have a significant impact on overall gas turbine efficiency and emissions.

Lower emission levels of nitrogen oxides and the like may be promoted by providing for good mixing of the fuel stream and the air stream prior to combustion. Such premixing tends to reduce combustion temperature gradients and the output of nitrogen oxides. One method of providing such good mixing is through the use of a combustor with a number of micro-mixer fuel nozzles. Generally described, a micro-mixer fuel nozzle mixes small volumes of the fuel and the air in a number of micro-mixer tubes within a plenum before combustion.

Although current micro-mixer combustors and micro-mixer fuel nozzle designs provide improved combustion performance, the operability window for a micro-mixer fuel nozzle in certain types of operating conditions may be defined at least partially by concerns with dynamics and emissions. Specifically, the operating frequencies of certain internal components may couple so as to create a high or a low frequency dynamics field. Such a dynamics field may have a negative impact on the physical properties of the combustor components as well as the downstream turbine components. Given such, current combustor designs may attempt to avoid such operating conditions by staging the flows of fuel or air to prevent the formation of a dynamics field. Staging seeks to create local zones of stable combustion even if the bulk conditions may place the design outside of typical operating limits in terms of emissions, flammability, and the like. Such staging, however, may require time intensive calibration and also may require operation at less than optimum levels.

There is thus a desire for improved micro-mixer combustor designs. Such improved micro-mixer combustor designs may promote good mixing of the flows of fuel and air therein so as to operate at higher temperatures and efficiency but with lower overall emissions and lower dynamics. Moreover, such improved micro-mixer combustor designs may accomplish these goals without greatly increasing overall system complexity and costs.

SUMMARY OF THE INVENTION

The present application and the resultant patent thus provide a combustor for use with a gas turbine engine. The combustor may include a number of micro-mixer fuel nozzles and a fuel injection system for providing a flow of fuel to the micro-mixer fuel nozzles. The fuel injection system may include a center hub for providing the flow of fuel therethrough. The center hub may include a first supply circuit for a first micro-mixer fuel nozzle and a second supply circuit for a second micro-mixer fuel nozzle.

The present application and the resultant patent further provide a fuel injection system for a combustor for use with a gas turbine engine. The fuel injection system may include a number of micro-mixer fuel nozzles, one or more of the micro-mixer fuel nozzles extending from a number of support struts, and with the support struts extending from a center hub. The center hub may include a first supply circuit for a first micro-mixer fuel nozzle and a second supply circuit for a second micro-mixer fuel nozzle.

The present application and the resultant patent further provide a combustor for use with a gas turbine engine. The combustor may include a number of micro-mixer fuel nozzles, a fuel injection system with a center hub for providing a flow of fuel to the micro-mixer fuel nozzles, and a linear actuator to maneuver the micro-mixer fuel nozzles and the center hub.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
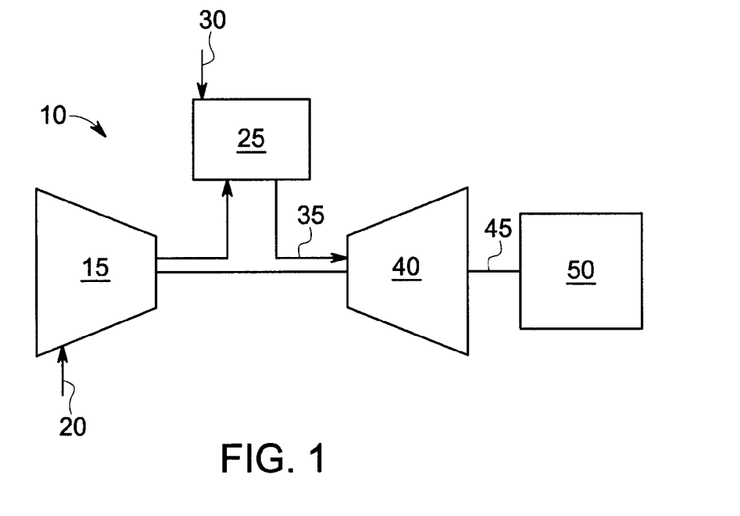
FIG. 1 a schematic diagram of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and combinations thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
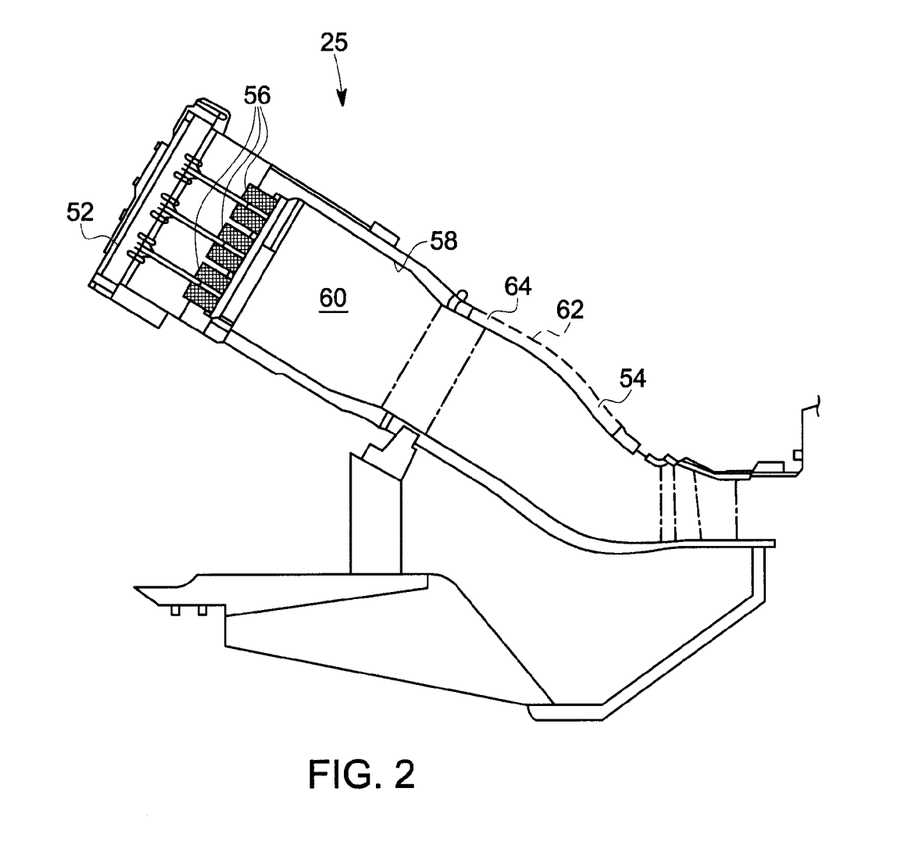
FIG. 2 is a schematic diagram of a combustor that may be used with the gas turbine engine of FIG. 1.

FIG. 2 shows a schematic diagram of an example of the combustor 25 as may be used with the gas turbine engine 10 described above and the like. The combustor 25 may extend from an end cover 52 at a head end to a transition piece 54 at an aft end about the turbine 40. A number of fuel nozzles 56 may be positioned about the end cover 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. Any number of the combustors 25 may be used herein in a can-annular array and the like. The combustor 25 described herein is for the purpose of example only. Combustors with other components and other configurations may be used herein.

Figure 3:
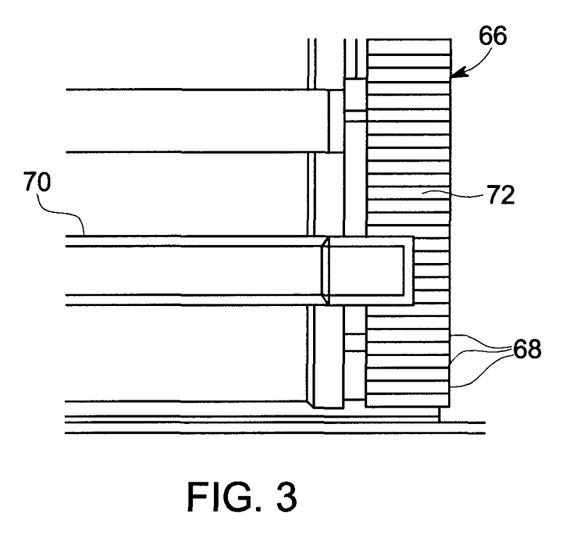
FIG. 3 is a schematic diagram of a portion of a micro-mixer fuel nozzle that may be used with the combustor of FIG. 2.

FIG. 3 shows a portion of a micro-mixer fuel nozzle 66 that may be used with the combustor 25 and the like. The micro-mixer fuel nozzle 66 may include a number of micro-mixer tubes 68 positioned about a fuel tube 70. The micro-mixer tubes 68 generally may have substantially uniform diameters and may be arranged in annular, concentric rows. Any number of the micro-mixer tubes 68 may be used herein in any size, shape, or configuration. The micro-mixer tubes 68 may be in communication with the flow of fuel 30 from the fuel tube 70 via a fuel plate 72 and the flow of air 20 from the compressor 15 via the flow path 64. A small volume of the flow of fuel 30 and a small volume of the flow of air 20 may mix within each micro-mixer tube 68. The mixed fuel-air streams may flow downstream for combustion in the combustion zone 60 and used in the turbine 40 as described above. Other components and other configurations may be used herein.

Figure 4:
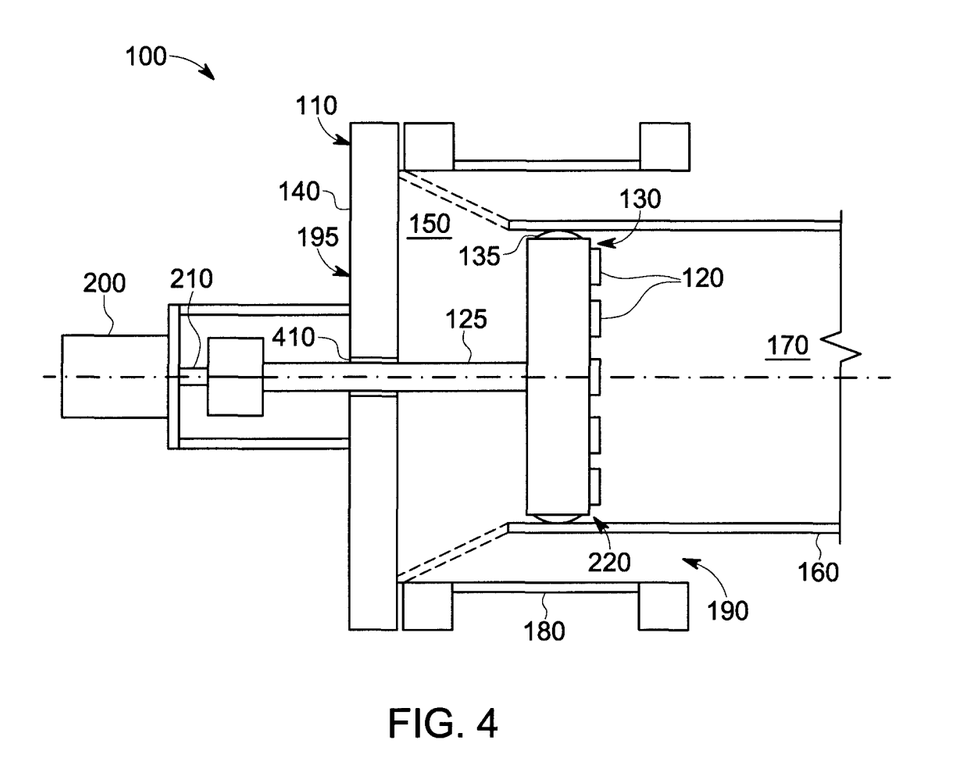
FIG. 4 is a schematic diagram of a micro-mixer combustor as may be described herein.

FIG. 4 shows an example of a combustor 100 as may be described herein. The combustor 100 may be a micro-mixer combustor 110 with any number of the micro-mixer fuel nozzles 120 and the like positioned therein. The micro-mixer fuel nozzles 120 may be similar to those described above. The micro-mixer fuel nozzles 120 may be sector shaped, circular shaped, and/or have any size, shape, or configuration. Likewise, the micro-mixer nozzles 120 may include any number of micro-mixer tubes therein in any configuration. The micro-mixer fuel nozzles 120 may be in communication with a common fuel tube 125. The common fuel tube 125 may carry one or more fuel circuits therein. The multiple fuel circuits thus may allow staging of the micro-mixer fuel nozzles 120. The micro-mixer fuel nozzles 120 may be mounted within a cap assembly 130 or a similar structure. The cap assembly 130 may have any size, shape, or configuration. The cap assembly 130 may be surrounded by a conventional seal 135 and the like.

Similar to that described above, the combustor 100 may extend from an end cover 140 at a head end 150 thereof. A liner 160 may surround the cap assembly 130 and the seal 135 with the micro-mixer fuel nozzles 120 therein. The liner 160 may define a combustion zone 170 downstream of the cap assembly 130. The liner 160 may be surrounded by a case 180. The liner 160, the case 180, and a flow sleeve (not shown) may define a flow path 190 therebetween for the flow of air 20 from the compressor 15 or otherwise. The liner 160, the combustion zone 170, the case 180, and the flow path 190 may have any size, shape, or configuration. Any number of the combustors 100 may be used herein in a can-annular array and the like. Other components and other configurations also may be used herein.

The combustor 100 also may be a variable volume combustor 195. As such, the variable volume combustor 195 may include a linear actuator 200. The linear actuator 200 may be positioned about the end cover 140 and outside thereof. The linear actuator 200 may be of conventional design and may provide linear or axial motion. The linear actuator 200 may be operated mechanically, electro-mechanically, piezeo-electrically, pneumatically, hydraulically, and/or combinations thereof. By way of example, the linear actuator 200 may include a hydraulic cylinder, a rack and pinion system, a ball screw, a hand crank, or any type of device capable of providing controlled axial motion. The linear actuator 200 may be in communication with the overall gas turbine controls for dynamic operation based upon system feedback and the like.

The linear actuator 200 may be in communication with the common fuel tube 125 via a drive rod 210 and the like. The drive rod 210 may have any size, shape, or configuration. The common fuel tube 125 may be positioned about the drive rod 210 for movement therewith. The linear actuator 200, the drive rod 210, and the common fuel tube 125 thus may axially maneuver the cap assembly 130 with the micro-mixer nozzles 120 therein along the length of the liner 160 in any suitable position. The multiple fuel circuits within the common fuel tube 125 may allow for fuel nozzle staging. Other components and other configurations also may be used herein.

In use, the linear actuator 200 may maneuver the cap assembly 130 so as to vary the volume of the head end 150 with respect to the volume of the liner 160. The liner volume (as well as the volume of the combustion zone 170) thus may be reduced or increased by extending or retracting the micro-mixer fuel nozzles 120 along the liner 160. Moreover, the cap assembly 130 may be maneuvered without changing the overall system pressure drop. Typical combustor systems may change the overall pressure drop. Such a pressure drop, however, generally has an impact on cooling the components therein. Moreover, variations in the pressure drop may create difficulties in controlling combustion dynamics.

Changing the upstream and downstream volumes may result in varying the overall reaction residence times and, hence, varying the overall emission levels of nitrogen oxides, carbon monoxide, and other types of emissions. Generally described, reaction residence time directly correlates to liner volume and thus may be adjusted herein to meet the emission requirements for a given mode of operation. Moreover, varying the residence times also may have an impact on turndown and combustor dynamics in that overall acoustic behavior may vary as the head end and the liner volumes vary.

For example, a short residence time generally may be required to ensure low nitrogen oxides levels at base load. Conversely, a longer residence time may be required to reduce carbon monoxide levels at low load conditions. The combustor 100 described herein thus provides optimized emissions and dynamics mitigation as a tunable combustor with no variation in the overall system pressure drop. Specifically, the combustor 100 provides the ability to vary actively the volumes herein so as to tune the combustor 100 to provide a minimal dynamic response without impacting on fuel staging.

Although the linear actuator 200 described herein is shown as maneuvering the micro-mixer fuel nozzles 120 in the cap assembly 130 as a group, multiple linear actuators 200 also may be used so as to maneuver individually the micro-mixer fuel nozzles 120 and to provide nozzle staging. In this example, the individual micro-mixer fuel nozzles 120 may provide additional sealing therebetween and with respect to the cap assembly 130. Rotational movement also may be used herein. Moreover, non-micro-mixer fuel nozzles also may be used herein and/or non-micro-mixer fuel nozzles and micro-mixer fuel nozzles may be used together herein. Other types of axial movement devices also may be used herein. Other component and other configurations may be used herein.

Figure 5:
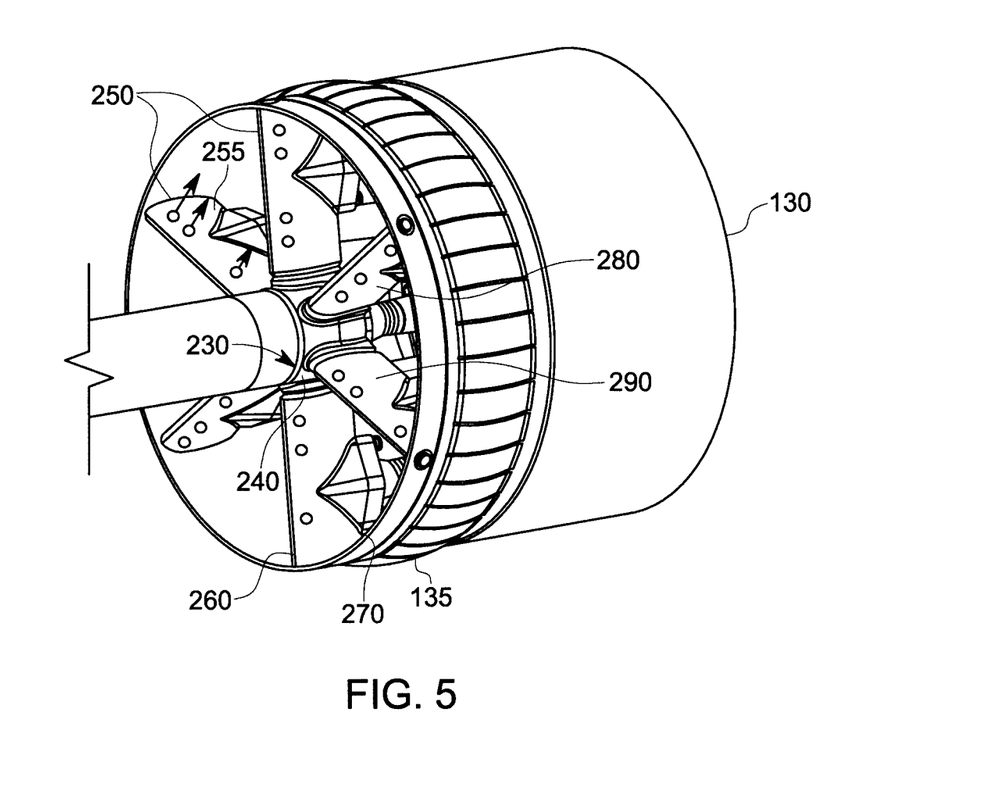
FIG. 5 is a perspective view of an example of the micro-mixer combustor of FIG. 4.
Figure 6:
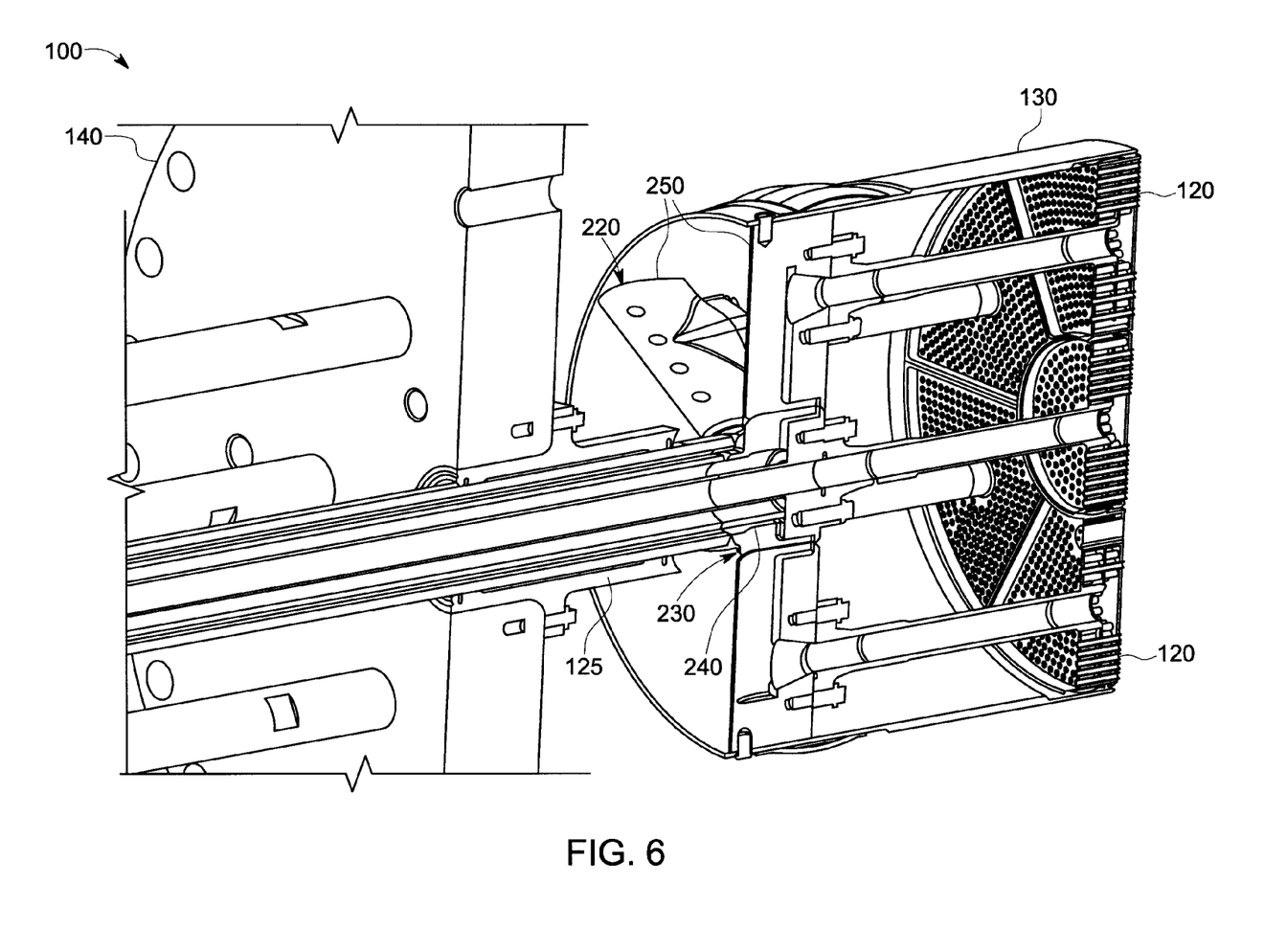
FIG. 6 is a side cross-sectional view of the micro-mixer combustor of FIG. 5.

FIG. 5 and FIG. 6 show an example of a pre-nozzle fuel injection system 220 that may be used with the combustor 100 and the like. Each of the fuel nozzles 120 may be mounted onto the pre-nozzle fuel injection system 220. The pre-nozzle fuel injection system 220 may include a fuel nozzle manifold 230. The fuel nozzle manifold 230 may be in communication with the common fuel tube 125 and may be maneuverable via the drive rod 210 as described above. The fuel nozzle manifold 230 may have any size, shape, or configuration.

The fuel nozzle manifold 230 of the pre-nozzle fuel injection system 220 may include a center hub 240. The center hub 240 may have any size, shape, or configuration. The center hub 240 may accommodate a number of different flows therein. The fuel nozzle manifold 230 of the pre-nozzle fuel injection system 220 may include number of support struts 250 extending from the center hub 240. Any number of the support struts 250 may be used. The support struts 250 may have a substantially aerodynamically contoured shape 255 although any size, shape, or configuration may be used herein. Specifically, each of the support struts 250 may include an upstream end 260, a downstream end 270, a first sidewall 280, and a second sidewall 290. The support struts 250 may extend radially from the center hub 240 to the cap assembly 130. Each support strut 250 may be in communication with one or more of the fuel nozzles 120 so as to provide the flow of fuel 30 thereto. The fuel nozzles 120 may extend axially from the downstream end 270 of each of the support struts 250. Other components and other configurations may be used herein.

Figure 7:
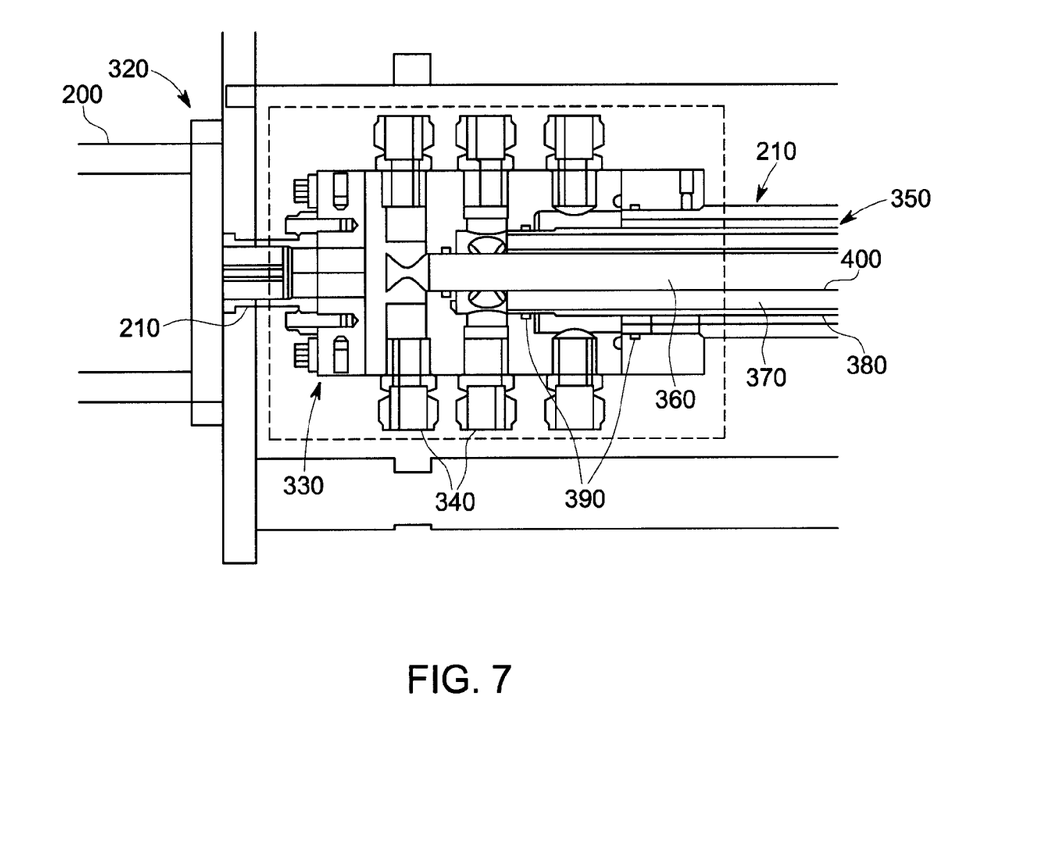
FIG. 7 is an expanded view of a portion of a nested fuel manifold system as may be used with the micro-mixer combustor of FIG. 5.

FIG. 7 shows a nested fuel manifold system 320 as may be described herein. The nested fuel manifold system 320 may cooperate with the pre-nozzle fuel injection system 220 or other type of fuel injection system so as to deliver safely one or more flows of fuel 30 to the fuel nozzles 120. Moreover, the nested fuel manifold system 320 also may cooperate with the linear actuator 200 and the drive rod 210 to accommodate the axial movement of the fuel nozzles 120 within the cap assembly 130 while limiting the number of penetrations through the end cover 140.

The nested fuel manifold system 320 includes a nested fuel manifold 330. The nested fuel manifold 330 may be positioned about the linear actuator 200 outside of the end cover 140 at the head end 150 for movement therewith. The nested fuel manifold 330 may include a number of fuel circuit connections 340. Any number of the fuel circuit connections 340 may be used. The fuel circuit connections 340 may be in communication with the same or different types of flows of fuel 30 so as to provide fuel flexibility herein. The fuel circuit connections 340 may have any size, shape, or configuration.

Each of the fuel circuit connections 340 of the nested fuel manifold 330 may be in communication with a nested fuel supply circuit 350. In this example, three (3) nested fuel supply circuits 350 are shown: a first nested fuel supply circuit 360, a second nested fuel supply circuit 370, and a third nested fuel supply circuit 380. Any number of the nested fuel supply circuits 350, however, may be used herein. The nested fuel supply circuits 350 may be annularly nested within each other such that the first nested fuel supply circuit 360 is positioned within the second nested fuel supply circuit 370 which, in turn, is positioned within the third nested fuel supply circuit 380. A fuel feed seal 390 may separate each of the nested fuel supply circuits 350. Each of the nested fuel supply circuits 350 may take the form of a flexible hose and the like. The nested fuel supply circuits 350 may have any size, shape, or configuration. The nested fuel supply circuits 350 collectively act as the common fuel tube 125.

Figure 8:
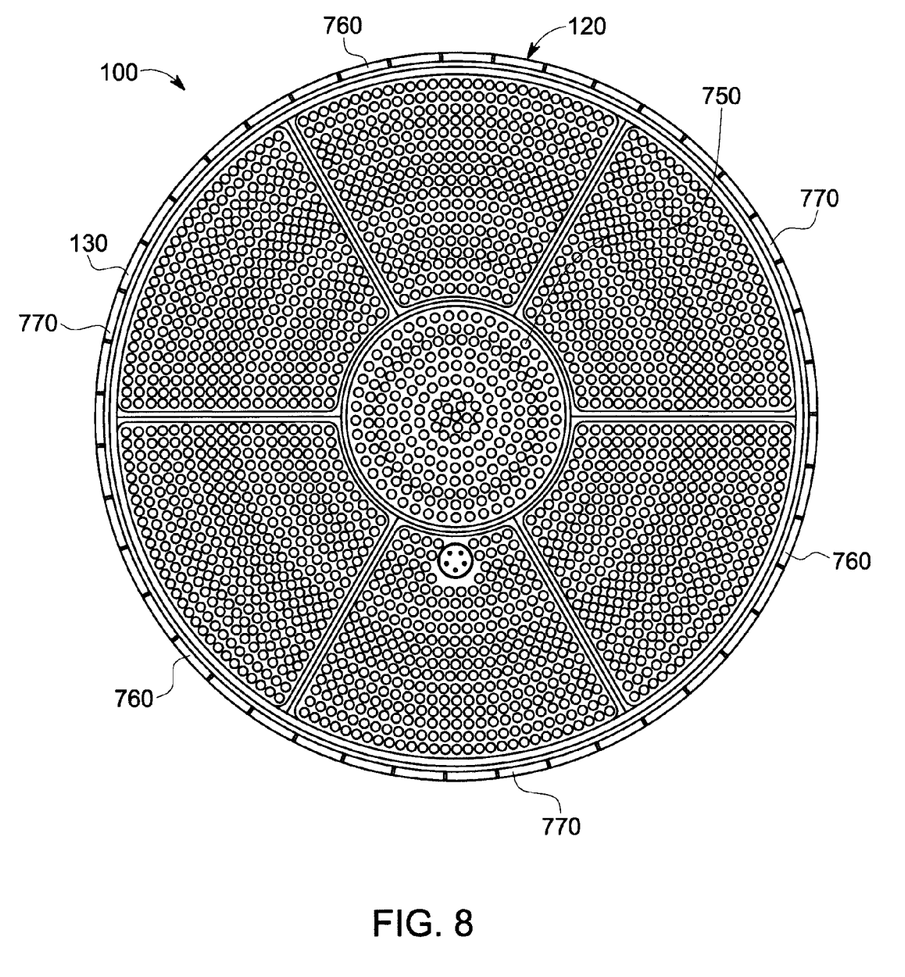
FIG. 8 is a plan view of a number of fuel nozzles for use in the micro-mixer combustor of FIG. 5.

Based upon the configuration of the center hub 240, the nested fuel supply circuits 350 may be staged in any number of configurations. For example, as is shown in FIG. 8, the first nested fuel supply circuit 360 may fuel a center nozzle 750. The second nested fuel supply circuit 370 may fuel a first set of outer nozzles 760. The third nested fuel supply circuit 380 thus may fuel a second set of outer fuel nozzles 770. Many other configurations, circuits, and nozzles, may be used herein.

As described above, fuel staging may provide improved emissions while allowing for additional tune-ability for combustion dynamics. The internal passages of the center hub 240 may include any number of variations. Given such, the center hub 240 provides a cost effective and simple method to improve overall combustor performance. The center hub 240 thus allows fuel staging without additional components. The center cub 240 may be manufactured in conventional techniques including machining, casting, additive manufacturing, or via welded or brazed components. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A combustor for use with a gas turbine engine, comprising:
a plurality of micro-mixer fuel nozzles; and
a fuel injection system for providing a flow of fuel to the plurality of micro-mixer fuel nozzles;
the fuel injection system comprising a center hub comprising a plurality of fuel circuits therein for providing the flow of fuel therethrough;
wherein the center hub comprises a first supply circuit therein for a first micro-mixer fuel nozzle of the plurality of micro-mixer fuel nozzles and a second supply circuit therein for a second micro-mixer fuel nozzle of the plurality of micro-mixer fuel nozzles, wherein the fuel injection system comprises a plurality of support struts extending radially from the center hub to a cap assembly, wherein the plurality of support struts comprise at least one support strut disposed upstream from the first and second micro-mixer fuel nozzles, wherein the second micro-mixer fuel nozzle extends towards a combustion zone from a downstream end of the at least one first support strut, wherein a flow of fuel in the second supply circuit passes through the center hub and into the at least one first support strut where it is then supplied to the second micro-mixer fuel nozzle.

2. The combustor of claim 1, wherein the plurality of micro-mixer fuel nozzles comprises a plurality of micro-mixer fuel tubes and a fuel plate.

3. The combustor of claim 1, wherein the plurality of support struts comprises an aerodynamic shape.

4. The combustor of claim 1, wherein the first micro-mixer fuel nozzle comprises a center micro-mixer fuel nozzle.

5. The combustor of claim 1, wherein the second micro-mixer fuel nozzle comprises an outer micro-mixer fuel nozzle.

6. The combustor of claim 5, wherein the outer micro-mixer fuel nozzle comprises a first set of outer micro-mixer fuel nozzles.

7. The combustor of claim 5, wherein the outer micro-mixer fuel nozzle comprises a second set of outer micro-mixer fuel nozzles.

8. The combustor of claim 1, wherein the fuel injection system is in communication with a common fuel tube with the first supply circuit and the second supply circuit therein.

9. The combustor of claim 8, further comprising a nested fuel manifold in communication with the common fuel tube with the first supply circuit and the second supply circuit therein.

10. The combustor of claim 8, further comprising an end cover and wherein the common fuel tube comprises a single entry port through the end cover.

11. The combustor of claim 1, wherein the center hub comprises a third supply circuit therethrough for a third micro-mixer fuel nozzle of the plurality of micro-mixer fuel nozzles.

12. The combust of claim 1, further comprising a linear actuator to maneuver the plurality of micro-mixer fuel nozzles and the center hub.

13. A fuel injection system for a combustor for use with a gas turbine engine, comprising:
a plurality of micro-mixer fuel nozzles;
one or more of the plurality of micro-mixer fuel nozzles extending from a plurality of support struts; and
the plurality of support struts extending radially from a center hub to a cap assembly;
wherein the center hub comprises a first supply circuit therein for a first micro-mixer fuel nozzle of the plurality of micro-mixer fuel nozzles and a second supply circuit therein for a second micro-mixer fuel nozzle of the plurality of micro-mixer fuel nozzles, wherein the plurality of support struts comprise a first support strut disposed between the wherein the plurality of support struts comprise at least one first support strut disposed upstream from the first and second micro-mixer fuel nozzles, wherein the second micro-mixer fuel nozzle extends towards a combustion zone from a downstream end of the at least one first support strut, wherein a flow of fuel in the second supply circuit passes through the center hub and into the at least one first support strut where it is then supplied to the second micro-mixer fuel nozzle.

14. The fuel injection system of claim 13, wherein the plurality of micro-mixer fuel nozzles comprises a plurality of micro-mixer fuel tubes and a fuel plate.

15. The fuel injection system of claim 14, wherein the first micro-mixer fuel nozzle comprises a center micro-mixer fuel nozzle.

16. The fuel injection system of claim 14, wherein the second micro-mixer fuel nozzle comprises an outer micro-mixer fuel nozzle.

17. The fuel injection system of claim 16, wherein the outer micro-mixer fuel nozzle comprises a set of outer micro-mixer fuel nozzles.

18. A combustor for use with a gas turbine engine, comprising:
a plurality of micro-mixer fuel nozzles;
a fuel injection system for providing a flow of fuel to the plurality of micro-mixer fuel nozzles;
the fuel injection system comprising a center hub comprising a plurality of fuel circuits therein for providing the flow of fuel therethrough;
a plurality of support struts extending radially from the center hub to a cap assembly, wherein the plurality of support struts are disposed upstream from the plurality of micro-mixer fuel nozzles, wherein at least one of the plurality of micro-mixer fuel nozzles extends towards a combustion zone from a downstream end of at least one of the plurality of support struts, wherein the flow of fuel in at least one of the plurality of fuel circuits passes through the center hub and into at least one of the plurality of support struts where it is then supplied to at least one of the plurality of micro-mixer fuel nozzles; and
a linear actuator to maneuver the plurality of micro-mixer fuel nozzles, the center hub, and the plurality of support struts.

* * * * *